United States Patent [19]
Ho

[11] Patent Number: 5,842,197
[45] Date of Patent: Nov. 24, 1998

[54] SELECTING A QUALIFIED DATA REPOSITORY TO CREATE AN INDEX

[75] Inventor: Alexander Channing Ho, Belmont, Calif.

[73] Assignee: Oracle Corporation, Redwood Shores, Calif.

[21] Appl. No.: 705,299

[22] Filed: Aug. 29, 1996

[51] Int. Cl.⁶ .................................................. G06F 7/08
[52] U.S. Cl. .......................... 707/2; 707/7; 707/101; 707/102
[58] Field of Search .................. 707/2, 7, 101, 707/102

[56] References Cited

U.S. PATENT DOCUMENTS

| | | | |
|---|---|---|---|
| 5,121,493 | 6/1992 | Ferguson | 395/600 |
| 5,274,805 | 12/1993 | Ferguson et al. | 395/600 |
| 5,307,486 | 4/1994 | Nakamigawa | 395/600 |
| 5,404,510 | 4/1995 | Smith et al. | 395/600 |
| 5,579,515 | 11/1996 | Hintz et al. | 395/607 |
| 5,619,693 | 4/1997 | Troisi | 395/607 |

*Primary Examiner*—Thomas G. Black
*Assistant Examiner*—Jean R. Homere
*Attorney, Agent, or Firm*—Blakely, Sokoloff, Taylor & Zafman LLP

[57] ABSTRACT

An improved method and apparatus for creating an index is disclosed. All data repositories containing the data necessary to create the index are identified, and one of these data repositories is then selected based on a predetermined criteria. The predetermined criteria includes the size of the possible data repositories, or a determination of which data repository will require the least amount of sorting. The selected data repository is then used to create an index.

24 Claims, 6 Drawing Sheets

| EXT | ADDRESS | LENGTH | HIGH WATER MARK INFO |
|-----|---------|--------|----------------------|
| 0 | A9 | 128 | - |
| 1 | B6 | 128 | - |
| 2 | A3 | 128 | - |
| 3 | C4 | 56 | 50% |

175

EXTENT MAP 250

SELECTING A QUALIFIED DATA REPOSITORY TO CREATE AN INDEX

FIELD OF THE INVENTION

This invention relates to the field of database management. Specifically, this invention relates to an improved method and apparatus for creating an index.

BACKGROUND OF THE INVENTION

In a relational database management system (DBMS), information is generally stored in tables, where each piece of data is stored at a particular row and column. A user can interact with these tables by submitting queries or statements to the DBMS. A transaction is a logical unit of work that comprises a series of queries or statements submitted to the DBMS for sequential execution.

To facilitate the processing of statements and transactions, the values of one or more columns of a table may be stored in an index maintained separately from the actual database table. Indexes increase the performance of data retrieval by providing faster access paths to table data. Typically, the index is stored in a data structure that facilitates searching, such as a B-tree structure. FIG. 1A illustrates a typical table 100 stored in a database. Table 100 has a plurality of rows and a plurality of columns. Each table in a DBMS may also have an internal column, or pseudocolumn, referred to as a rowid. The table's rowid pseudocolumn is not displayed when the table's structure is listed. It is, however, retrievable by a query and can be used to uniquely identify a row in the table.

FIG. 1B illustrates an example of a B-tree index. A B-tree consists of a set of nodes connected in a hierarchical arrangement. A B-tree contains two types of nodes: branch nodes and leaf nodes. Leaf nodes reside at the lowest level of the hierarchy and contain actual values from the column to which the index corresponds. For example, B-tree 150 in FIG. 1B is an index for column C of table 100, where column C contains numbers ranging from 1–400. Nodes 120, 125, 130 and 135 of B-tree 150 are leaf nodes that contain values from column C of table 100. Along with the values, leaf nodes store the corresponding rowid of the rows in table 100 that contain the values. For example, if value C1 in column C of table 100 is the number 50, then for a particular row with rowid 321, leaf node 120 would contain the number 50 associated with the rowid 321.

All the nodes in B-tree 150 that are not leaf nodes are branch nodes. Branch nodes contain data that indicates a range of values. In the illustrated B-tree 150, nodes 105, 110 and 115 are branch nodes, and therefore correspond to ranges of values. Each branch node includes a threshold value that determines which node at the next level in the B-tree will contain the value that a user is attempting to locate. For example, in FIG. 1B, the threshold values include 201 for node 105, 101 for node 110 and 301 for node 115. The range of values identified in each branch node is such that all nodes that reside below a given branch node correspond to values that fall within the range of values represented by the branch node.

The smallest quantity of data that can be read from a persistent store, such as a disk, into dynamic memory is typically referred to as a "block." If a database system requires any information stored in a particular block, the database system must read the entire block into memory. To create an index using data from a particular column of a table, a database system must read all blocks that have any data from that column of the table. Because values for the indexed column may be present in all or almost all blocks of a table, the entire base table or a significant portion of the table must be read into memory during the index creation process. This may be very costly, as the index data may be a small percentage of the data stored in the table.

For example, as illustrated in FIG. 1A, Table 100 contains the columns A, B, and C. If the user desires to create an index I1 on the columns A and C, the database system would have to read all of blocks 1–N in order to create the index. Thus, although column B is unnecessary for the index, values from column B will have to be read into memory anyway. If the user then desires to build a second index I2 on column A only, all of blocks 1–N will have to be read into memory again, although values from columns B and C are unnecessary. In both cases, the necessary data is used to create the indexes and the remaining data is not used.

This reading and re-reading of the entire table in order to create indexes that require only a small subset of data from the table is clearly expensive, both in terms of memory and performance. It is therefore desirable to provide an improved method and apparatus for building indexes.

SUMMARY OF THE INVENTION

The present invention provides a method and apparatus for building an index for a table. According to one embodiment of the invention, an index is built from a data repository other than the original underlying table, where the data repository contains all information necessary to build the index. This data repository can be an index built earlier on the same set, or a superset, of columns of the underlying table.

According to one aspect of the invention, all data repositories containing the data necessary to create the index are identified and one of these data repositories is then selected. An index is then created from the selected data repository. This selection is made based on a predetermined selection criteria such as the size of the possible data repositories or a determination of which data repository will require the least amount of sorting. In one embodiment, an extent map is used to determine which data repository can be loaded into the smallest amount of memory. In an alternate embodiment, a data dictionary is used instead of an extent map to determine which data repository can be loaded into the smallest amount of memory. A data dictionary contains information about every table and index in a database and can be used to determine the length and size of data stored within each table.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention provides a solution to the disadvantages of prior art methods for creating indexes. Instead of always using data from the original table to build an index on the table, the present invention determines all data repositories, including the original table, in the database that contain the information necessary to build an index on specific columns for the original table. Then, based on a predetermined criteria, one of the data repositories containing the necessary information is used to build the index. In the following detailed description, numerous specific details are set forth in order to provide a thorough understanding of the present invention. It will be apparent to one of ordinary skill in the art, however, that these specific details need not be used to practice the present invention. In other instances, well know structures, interfaces and processes have not been shown in detail in order not to unnecessarily obscure the present invention.

Figure 2:
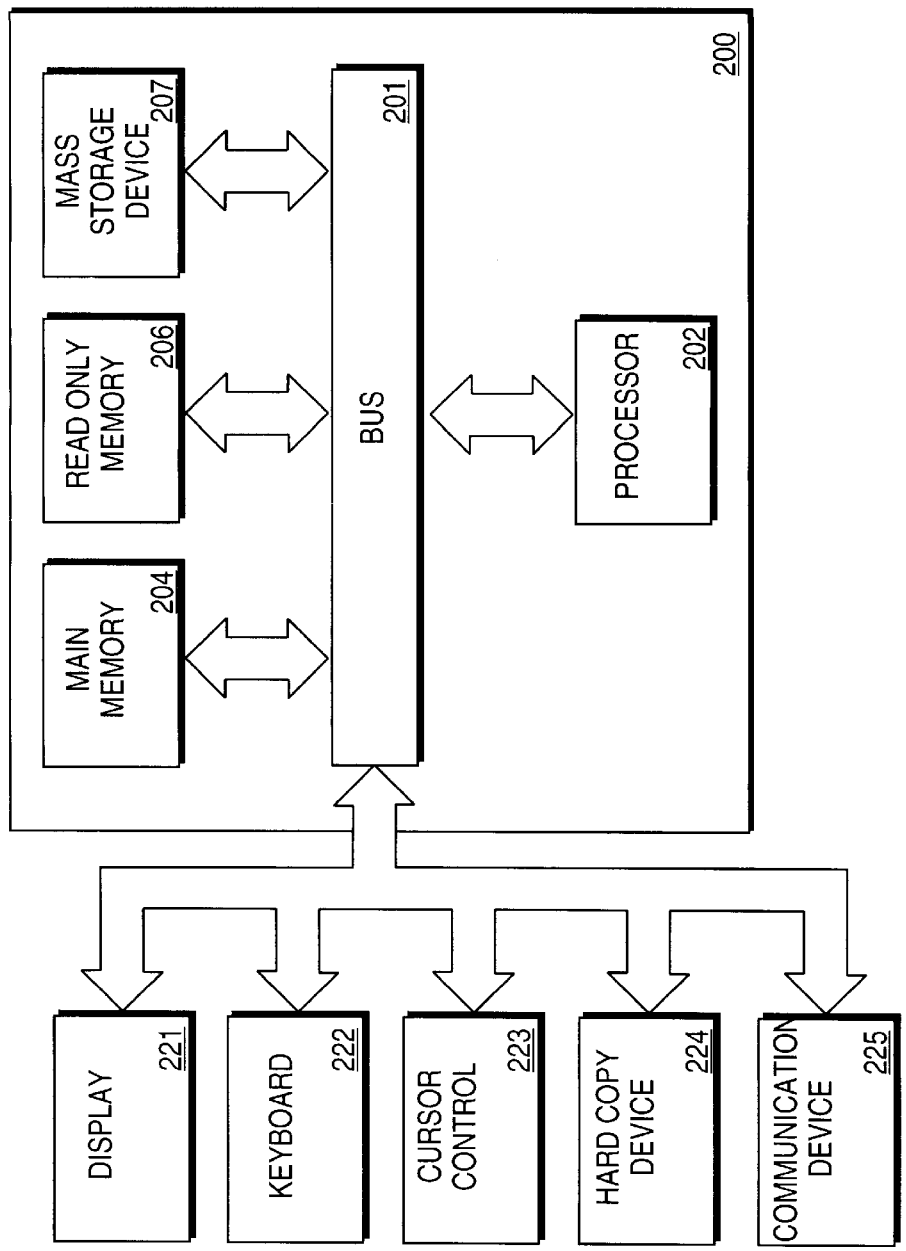
FIG. 2 illustrates a computer system upon which an embodiment of the present invention can be implemented.

Referring to FIG. 2, the computer system upon which an embodiment of the present invention can be implemented is shown as 200. Computer system 200 comprises an internal bus or other communication means 201 for communicating information, and a processing means 202 coupled with internal bus 201 for processing information. System 200 further comprises a random access memory (RAM) or other dynamic storage device 204 (referred to as main memory), coupled to internal bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to internal bus 201 for storing static information and instructions for processor 202. Data storage device 207 is coupled to internal bus 201 for storing information and instructions.

A data storage device 207 such as a magnetic disk or optical disc and its corresponding drive can be coupled to computer system 200. Computer system 200 can also be coupled via internal bus 201 to a display device 221, such as a cathode ray tube (CRT), for displaying information to a computer user. An alphanumeric input device 222, including alphanumeric and other keys, is typically coupled to internal bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed data repository on a computer screen can be selected by using a stylus or pen to touch the displayed data repository. The computer detects the selection by implementing a touch sensitive screen. Similarly, a light pen and a light sensitive screen can be used for selecting a displayed data repository. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to build an index for a table from a data repository other than the table. According to one embodiment, such an index is built by computer system 200 in response to processor 202 executing sequences of instructions contained in memory 204. Execution of the sequences of instructions contained in memory 204 causes processor 202 to determine all data repositories in the database that contain the information necessary to build an index on a specific column or columns of a table. These data repositories will be referred to hereafter as "qualified data repositories." One of these qualified data repositories is then selected based on a predetermined criteria. This predetermined criteria may include, for example, the size of the data repository, the amount of sorting that the data repository would require or the number of disk input-output (I/O) operations the data repository would have to perform. An index is then created from the selected qualified data repository, as will be described hereafter. In alternative embodiments of the present invention, hard-wired circuitry may be used in place of or in combination with software instructions to implement the present invention. Thus, the present invention is not limited to any specific combination of hardware circuitry and software.

Figures 3A, 3B:
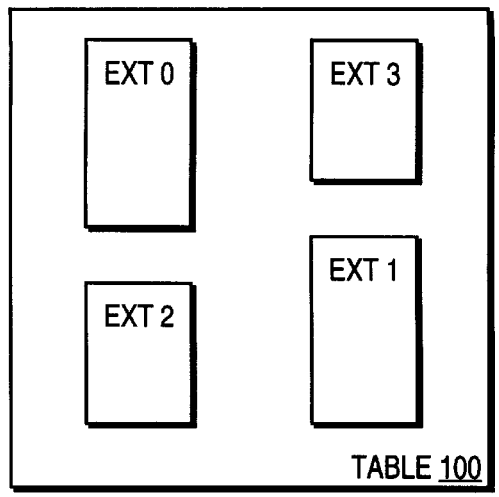
FIG. 3A illustrates how data is physically stored on a disk in "extents"
FIG. 3B illustrates an "extent map" containing information corresponding to the data in the extents.

In an embodiment of the present invention that uses data repository size as the predetermined criteria to select among qualified data repositories, the sizes of each of the qualified data repositories in a database have to be determined before an index is built. FIGS. 3A–B illustrate an example of how data is physically stored on a disk and how this stored data is used to determine the size of data repositories in a database . Each table and index in the database includes one more "extents," as illustrated in FIG. 3A. An extent is a logical unit of database storage space made up of a contiguous number of blocks. Other logical units of database storage space may also be utilized.

Information corresponding to the data in the extents is stored in an "extent map" as illustrated in FIG. 3B. The extent map contains the address of the extents on disk as well as the length (or size) of each extent. Extent maps recognize the entire portion of memory that is allocated to any data repository, but they also include "high water" mark information to indicate when an extent is not full. For example, as illustrated in FIG. 3B, Ext0, Ext1 and Ext2 are full, but Ext3 includes high-water mark information that indicates the extent is only partially used. Alternative high-water mark information may also be utilized. The high-water mark information is used to accurately calculate the the size of Ext3, and the remaining allocated memory will be ignored.

Figure 4:
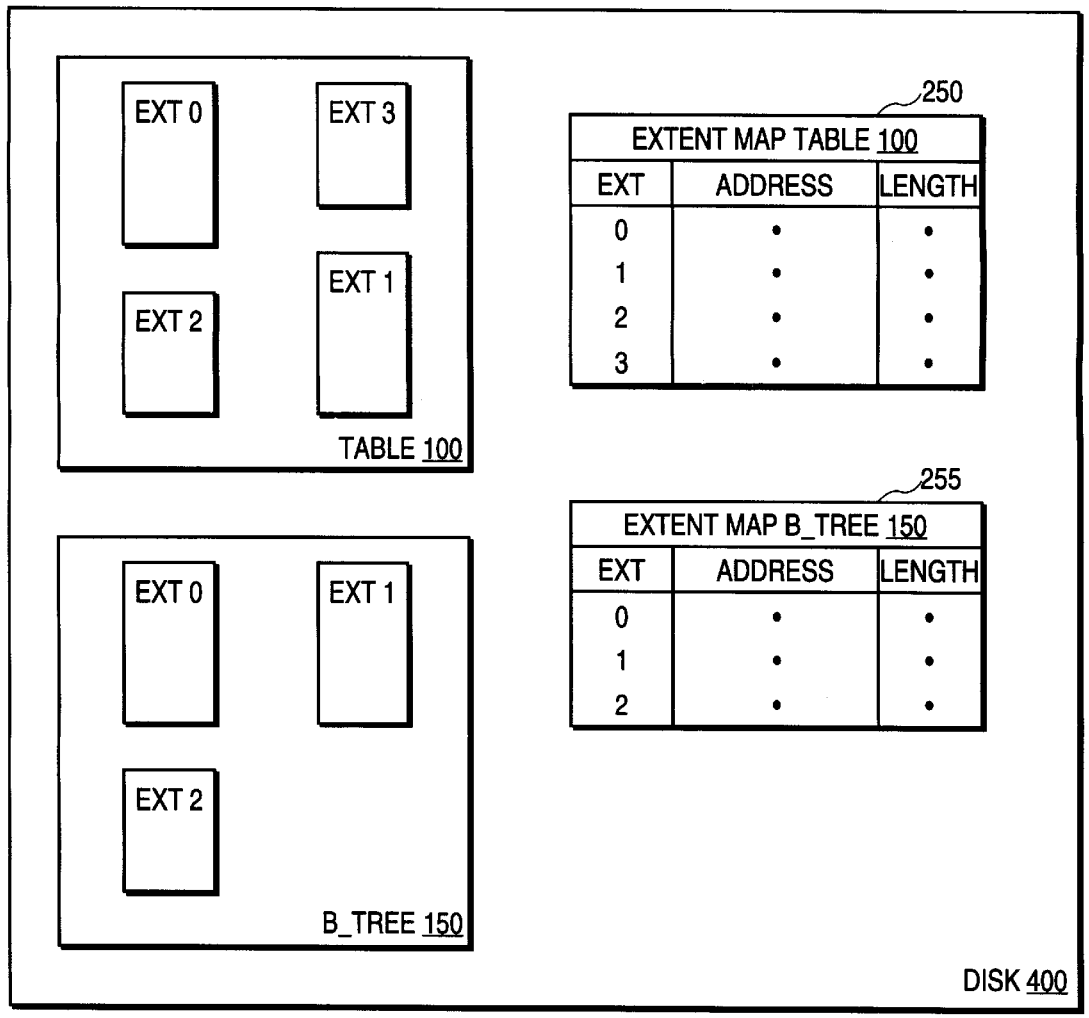
FIG. 4 illustrates extent maps for a table and a B-tree.

According to one embodiment of the present invention, the size of the data repositories in the database is determined by reading extent maps. For example, as illustrated in FIG. 4, the data for table 100 and B-tree 150 are stored within extents on disk 400. For the purposes of illustration, all extents in FIG. 4 are shown as residing in a single disk 400. The extents may also reside on different disks and a single extent may span multiple disks. Information about the extents used by table 100 and B-tree 150 are stored in extent maps 250 and 255 respectively. For example, if B-tree 150 is index I1 on the columns A and C of table 100, and the user wants to build index I2 on column A, one embodiment of the present invention determines from an examination of extent maps 250 and 255 that B-tree 150 uses less total space on disk than table 100. Consequently, B-tree 150 will be smaller when loaded into memory than table 100. This is likely because B-tree 150 includes data from columns A and C only, while table 100 includes data from columns A, B and C.

In another embodiment of the present invention, the database system examines a data dictionary instead of extent maps to determine the size of data repositories in the database. A data dictionary is a set of tables and views that are used as a reference about the database. A data dictionary stores information about both the logical and physical structure of the database. Consequently, the data dictionary can be read to determine the size of qualified data repositories.

In contrast to extent maps that include "high water" mark information, a data dictionary has no indication of when the extents of a table or index are not full. The data dictionary merely knows the amount of space allocated to a data repository, and indicates the entire allocated storage as the size of the data repository, regardless of whether the entire allocated space is actually used. Thus, the use of a data dictionary rather than an extent map to determine the size of qualified data repositories can result in a significantly different selection of the "smallest" qualified data repository.

Figure 5:
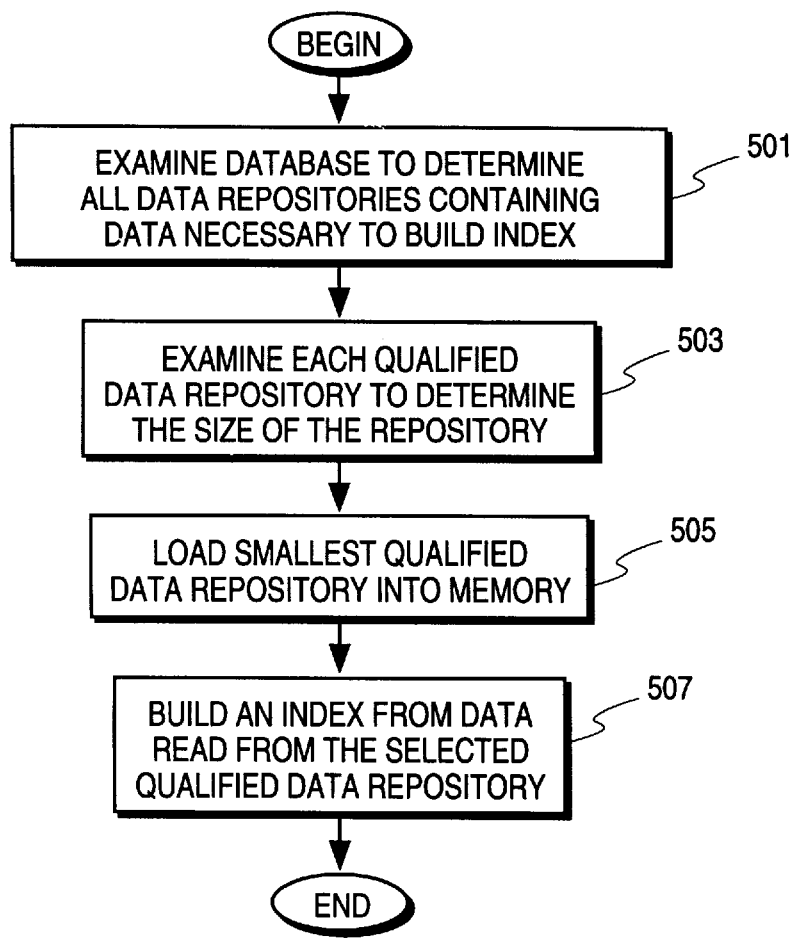
FIG. 5 is a flow chart that illustrates steps for building an index according to one embodiment of the present invention.

FIG. 5 is a flow chart that illustrates steps for building an index according to one embodiment of the present invention. According to this embodiment of the invention, before building an index, in step 501, the database system first determines all data repositories in the database that contain the data necessary to build the index. Each qualified data repository is then examined in step 503 to determine the size of the data repository.

Once the smallest qualified data repository has been identified, the qualified data repository is loaded into memory in step 505, and an index is built from the data read from the qualified data repository in step 507. Generally, this data repository will either be the underlying table for which the index is being created or a qualified data repository, such as another index, that is smaller than the base table.

Figure 1A:
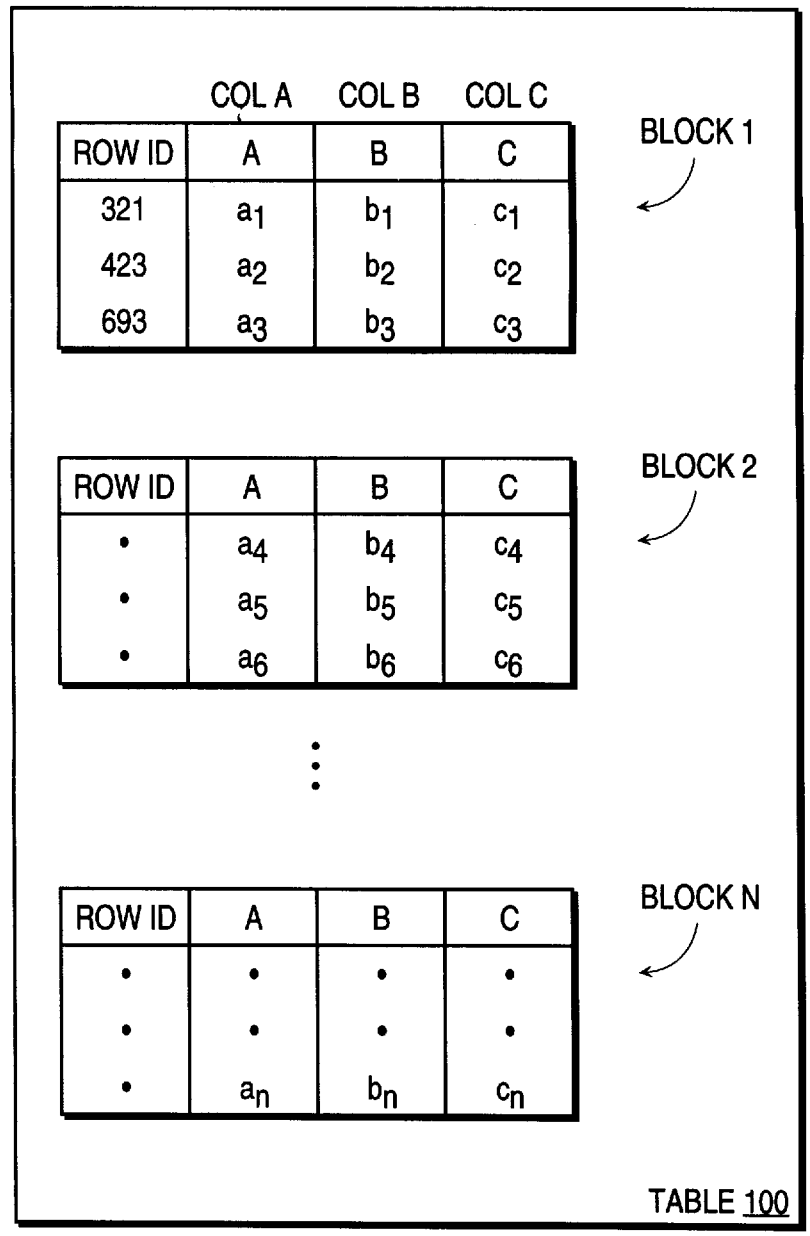
FIG. 1A illustrates a typical table stored in a database (prior art)
Figure 1B:
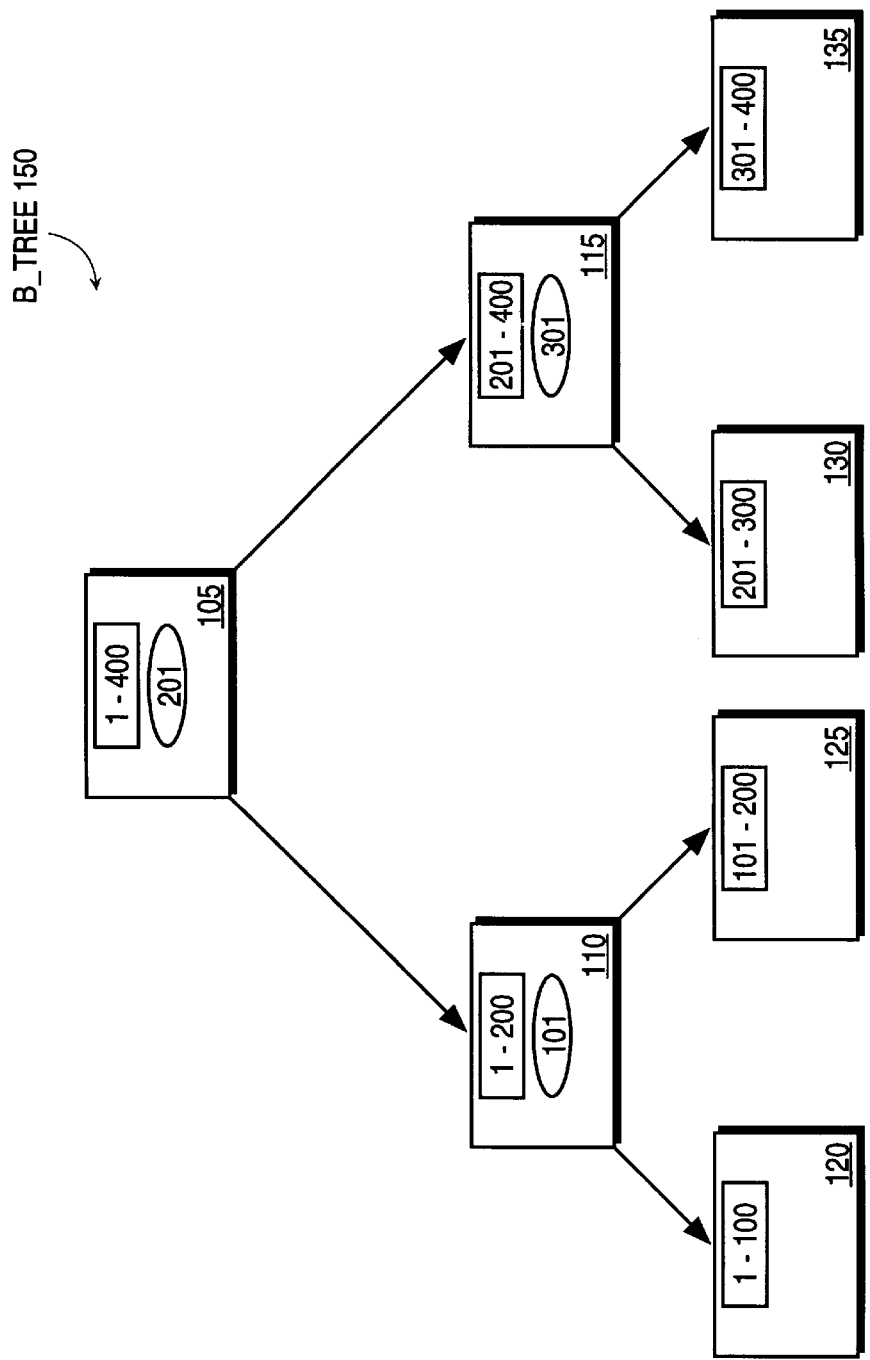
FIG. 1B illustrates an example of an index stored in a B-tree structure (prior art)

If the predetermined criteria for selecting a qualified data repository is the amount of sorting required by the data repository, the manner of reading the data from the physical disk determines the selected qualified data repository. For example, in order to retrieve data from B-tree 150 in FIG. 1B, the database system can "walk the leaves" of B-tree 150, namely moving from one node to a "linked" or subsequent node on B-tree 150. The result of this type of a read operation is that data is retrieved in the same order as stored in the index, and therefore requires little or no sorting. There is no correlation in this embodiment, however, between the order of entries in the B-tree and the order in which the entries are stored on disk. Thus, entries in the B-tree may be stored in any order within the extents illustrated in FIG. 4. To retrieve all the necessary data, the database system may have to seek across large portions of the disk to locate a one segment of data, move to that portion of the disk to read the data, and then scan the disk again for a subsequent segment of data.

Alternatively, one aspect of the present invention allows the database system to read data "sequentially" from the physical disk, namely without regard to the order in which the data is stored. Thus, in FIG. 4, data is read sequentially from the disk, in the order in which the data is encountered on disk. Reading data in this sequential manner eliminates the need for the database system to seek across large portions of the disk to locate a correct subsequent data segment. This results in a faster read operation. The data is retrieved in a random order, however, and consequently, the retrieved data may have to be sorted prior to use.

Thus, an improved method and apparatus for creating an index is disclosed. The specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method comprising:
    identifying a plurality of data repositories each including one or more logical units of database storage that contain data necessary to create an index;
    selecting a first data repository from among said plurality of data repositories based on a predetermined selection criteria; and
    creating said index from said first data repository.

2. The computer-implemented method of claim 1 further comprising determining respective sizes of said plurality of data repositories and wherein selecting said first data repository includes selecting said first data repository based on its size.

3. The computer-implemented method of claim 2 wherein the one or more logical units of database storage are one or more extents and wherein determining respective sizes of said plurality of data repositories includes reading one or more extent maps to determine said respective sizes.

4. The computer-implemented method of claim 3 wherein reading one or more extent maps to determine said respective sizes includes:
    reading a first value that indicates an amount of storage space allocated to an extent included in one of the plurality of data repositories;
    reading a second value that indicates whether the storage space allocated to the extent is full; and
    determining a size of the extent based on the first and second values.

5. The computer implemented method of claim 4 wherein the second value is a high water mark and wherein determining a size of the extent based on the first and second values includes determining the size of the extent to be the allocated amount of storage space indicated by the first value less an unused portion of the allocated amount of storage space indicated by the high water mark.

6. The computer-implemented method of claim 2 wherein determining respective sizes of said plurality of data repositories includes reading a data dictionary to determine said respective sizes.

7. The computer-implemented method of claim 1 wherein selecting said first data repository includes determining which one of said plurality of data repositories will require the least amount of disk read operations to retrieve data necessary for creating said index.

8. The computer-implemented method of claim 1 wherein selecting said first data repository includes determining which one of said plurality of data repositories will require the least amount of sorting to create said index.

9. The computer-implemented method of claim 8 further comprising reading data from a physical storage medium sequentially to retrieve data from said first data repository necessary for creating said index from said first data repository.

10. The computer-implemented method of claim 9 further comprising sorting said data read from a physical storage medium sequentially prior to creating said index.

11. The computer-implemented method of claim 8 further comprising reading data from a physical storage medium non-sequentially to retrieve data from said first data repository necessary for creating said index from said first data repository.

12. The computer-implemented method of claim 1 wherein selecting said first data repository includes selecting an index of a database table.

13. The computer-implemented method of claim 1 wherein identifying said plurality of data repositories includes identifying said plurality of data repositories in a database.

14. A computer system comprising:
   a storage device containing a plurality of data repositories each including one or more logical units of database storage that contain data necessary to create an index; and
   a processor that selects a first data repository from said plurality of data repositories based on a predetermined selection criterion; and
   said processor creating said index from said first data repository.

15. A computer-readable medium having instructions stored thereon which, when executed by a processor, cause the processor to:
   identify a plurality of data repositories each including one or more logical units of database storage that contain data necessary to create an index;
   select a first data repository from among the plurality of data repositories based on a predetermined selection criteria; and
   create the index from the first data repository.

16. The computer-readable medium of claim 15 wherein the computer-readable medium includes one or more disks having instructions stored thereon.

17. The computer-readable medium of claim 15 wherein the instructions, when executed by the processor, further cause the processor to determine respective sizes of the plurality of data repositories and wherein selecting the first data repository includes selecting the first data repository based on its size.

18. The computer-readable medium of claim 17 wherein the one or more logical units of data base storage are one or more extents and wherein the instructions, when executed, cause the processor to read one or more extent maps to determine the respective sizes of the plurality of data repositories.

19. The computer-readable medium of claim 17 wherein reading one or more extent maps to determine the respective sizes of the plurality of data repositories includes determining a size of at least one of the plurality of data repositories by determining an amount of storage space used by each of the one or more extents that are included in the at least one of the plurality of data repositories.

20. The computer-readable medium of claim 19 wherein determining an amount of storage space used by each of the one or more extents includes:
   reading a first value that indicates an amount of storage space allocated to a first extent of the one or more extents;
   reading a second value that indicates whether the storage space allocated to the first extent is full; and
   determining an amount of storage space used by the first extent based on the first and second values.

21. The computer-readable medium of claim 20 wherein the second value is a high water mark and wherein determining an amount of storage spaced used by the first extent based on the first and second values includes determining the amount of storage space used by the first extent to be the allocated amount of storage space indicated by the first value less an unused portion of the allocated amount of storage space indicated by the high water mark.

22. The computer-readable medium of claim 17 wherein the instructions, when executed, cause the processor to read a data dictionary to determine the respective sizes of the plurality of data repositories.

23. The computer-readable medium of claim 15 wherein the processor selects the first data repository by determining which one of the plurality of data repositories will require the least amount of disk read operations to retrieve data necessary for creating the index.

24. The computer-readable medium of claim 15 wherein the processor selects the first data repository by determining which one of the plurality of data repositories will require the least amount of sorting to create the index.

* * * * *